(12) United States Patent
Barton et al.

(10) Patent No.: US 7,220,942 B2
(45) Date of Patent: May 22, 2007

(54) FEEDER FOR ENDLESS WELDING WIRE

(75) Inventors: David J. Barton, Twinsburg, OH (US); Michael A. Carroscia, Newbury, OH (US); Christopher Hsu, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 196 days.

(21) Appl. No.: 10/955,729

(22) Filed: Sep. 30, 2004

(65) Prior Publication Data
US 2006/0070984 A1 Apr. 6, 2006

(51) Int. Cl.
B23K 9/12 (2006.01)
B65H 23/00 (2006.01)
B65H 26/00 (2006.01)
B65H 57/18 (2006.01)

(52) U.S. Cl. ........... 219/137.2; 242/171; 242/563.1; 242/566; 242/615.3

(58) Field of Classification Search ........... 242/171, 242/566, 615.3, 417.3, 560, 563, 563.1, 481; 219/137.2, 137.7; 226/195, 196.1
See application file for complete search history.

(56) References Cited

U.S. PATENT DOCUMENTS

| | | | | |
|---|---|---|---|---|
| 2,880,305 A | * | 3/1959 | Baird | ........... 219/137.31 |
| 3,990,620 A | | 11/1976 | Gellner | |
| 5,491,737 A | | 2/1996 | Yarnall | |
| 5,553,810 A | * | 9/1996 | Bobeczko | ........... 242/601 |
| 5,739,704 A | * | 4/1998 | Clark | ........... 326/62 |
| 5,971,308 A | * | 10/1999 | Boulton | ........... 242/131 |

FOREIGN PATENT DOCUMENTS

JP 59-229287 * 12/1984
WO WO 2002/094493 A1 11/2002

OTHER PUBLICATIONS

Bimba Manufacturing Rodless Cylinder Catalog.

* cited by examiner

*Primary Examiner*—Kevin P. Kerns
(74) *Attorney, Agent, or Firm*—Fay Sharpe LLP

(57) ABSTRACT

A device is provided for feeding an endless welding wire stored in a first container in a first coil generally concentric with a first vertical axis and a second container in a second coil generally concentric with a second vertical axis spaced longitudinally from the first axis in a given direction. The novel device including a track element extending in a path generally including the coil axes and extending above the coils in the given direction. A grommet, with a vertical wire receiving guide opening, is mounted on a support mechanism carried by the track element for movement of the grommet above the coils and along the path of the track element.

68 Claims, 14 Drawing Sheets

FEEDER FOR ENDLESS WELDING WIRE

The present invention relates to the art of electric arc welding and more particularly to a feeder device for feeding an endless welding wire to an arc welding station.

INCORPORATION BY REFERENCE

The welding wire feeding device of the present invention relates to the concept of using a continuous welding wire from successive drums containing coiled wire with a feed end and a trailing end, both of which ends are exposed from the top of the drum with the trailing end of the coil being fed to the welding station butt welded to the feed end of the next coiled welding wire. This high production technology is becoming quite popular with mass production lines such as used in automobile production. One feeder suggested for commercial application is described in PCT application WO 02/094493 where the spaced drums incorporate a wire feeder using an upper guide tube only. This application is incorporated by reference herein as background information regarding the technology to which the present invention is directed.

In accordance with the invention, a feeding grommet is moved over the drums to accommodate feeding of a coil from each of the spaced containers. The grommet of the invention is mounted to be moved in a given path by a rodless cylinder. A catalog for a rodless cylinder by Bimba Manufacturing is incorporated by reference herein as background information. The cylinder is also disclosed in Clark U.S. Pat. No. 5,739,704 and Yarnall U.S. Pat. No. 5,491,737. These patents are incorporated by reference.

BACKGROUND OF INVENTION

For high production electric arc welding, especially in the automobile industry, there is substantial development work directed to providing endless welding wire from a continuous supply of wire by butt welding the ends of wire in coils of adjacent packages, such as drums. The use of endless welding wire reduces the down time associated with package change over in automatic and robotic welding. Endless welding wire involves welding wire coiled in two adjacent packages butt welded together so that as one coil is exhausted, the second coil automatically provides welding wire. To continue the supply of endless welding wire, an empty container is replaced by a new container having a first wire end forming the normal feed wire end and an exposed trailing end from the bottom of the new coil. The feed end is then butt welded to the exposed trailing end of the previous wire coil to continue providing welding wire. This technique is well known; however, it is seldom used because of the difficulty in feeding the wire from one coil and then the next coil by a single wire feeding device capable of accommodating wire from one drum and then wire from the next drum. The common wire feeding mechanism is a feeding grommet spaced substantially above and generally between the two containers or drums so that the wire from one drum is pulled through the vertically spaced grommet and then wire from the second drum is pulled through the same grommet. To prevent tangles and sharp bends, the vertically spaced feed grommet must be substantially above the two adjacent containers or drums. This typical feeding device for endless welding wire has two major disadvantages. First, the feed grommet is over 2 feet above the top of the adjacent containers. This creates interference with associated mechanisms and structures adjacent the wire feeder. Consequently, the two drums and the wire feeder must be spaced away from the welding station or robot so that it is in an area having a vertical clearance. In some factories, such clearance is not available, thus, causing rejection of this feeder for an endless welding wire. Furthermore, the welding wire is normally at the open circuit voltage of the welding operation. Thus, the wire extending from the packages to the grommet exposes high voltage, requiring some type of protective guard around the feeding operation. Such guard presents another obstacle to using the standard feeding device for endless welding wire. In an effort to reduce the height necessary for the feeding grommet it has been proposed that the feeding grommet be mounted on a swinging arm that pivots from the center of one welding wire coil to the center of the adjacent welding wire coil, as the first coil is exhausted and the second coil replaces the first coil. This swinging arm allows the endless welding wire from the first coil to be pulled through the feeding grommet directly above the coil. As the next coil is used, the arm pivots to a position above the second coil. This mechanism reduces the height of the feeding grommet and the length of bare wire exposed during the welding operation. To assure proper orientation of the feeding grommet, the swinging arm carrying the grommet has two arcuate positions, normally locked in place by a spring biased detent. This swinging arm feeding device does reduce the height of the mechanism, but not to any great extent. The swinging action from one coil to the other coil of the endless welding wire must avoid sharp bends in the wire. Thus, the vertical height remained a spatial problem. Furthermore, the pivoting arm, not only caused certain difficulties when shifting from one coil to the next coil, but also maintained a large length of exposed, bare welding wire with open circuit voltage. The high fixed feeding grommet and swinging arm feeding grommet constitute background technology to which the present invention is directed. They both have the problem of excessive height requiring vertical clearance for the area containing the two welding wire packages and result in a substantial length of exposed wire. Furthermore, the swinging arm feeding device promotes tanglements, as the arm swung from one coil supply to the next coil supply at changeover. The present invention relates to an improved feeding device for an endless welding wire that overcomes the disadvantages associated with prior attempts in this technical area.

PRESENT INVENTION

The present invention solves the problems associated with prior devices for endless welding wire installations. Such installations involve two specially wound supplies or coils of welding wire, wherein each supply has an exposed end of welding wire, which is the initial feed end for the coiled wire. The wire package also includes the trailing end of the wire on the coil, which end extends along the outside of the coil and is exposed at the open end of the container. The container is normally a drum, but could be a cardboard box. Two containers are mounted together at the endless welding wire installation. The feeding end of the first wire coil is directed through the upper guide grommet of the feeding device, which device is connected to the welding station by a guide tube normally a plastic sheath. A butt welding mechanism not forming a part of the present invention is then actuated to butt weld the exposed trailing end of the first welding wire coil with the feed end of the adjacent welding wire coil. The butt welder pushes the two ends together and directs an electric current for $I^2R$ heating the butt junction. This upsets the end surfaces and welds the two welding wires together. Then, the butt joint with its flash is hand filed or passed through a sizing stripper. Thus, the two supplies of welding wire are joined together to form what is termed an "endless welding wire." The endless wire is pulled through the upper guide grommet and directed to the welding station from the first coiled supply of welding wire. When this welding wire coil is exhausted, the second coil is then used for welding. At that time, the second package is either shifted to the first position or the next package replaces the first exhausted package. This next package has a coil of welding wire with an exposed normal feed end and has an exposed trailing end. The butt welding procedure is repeated to join the next coil of welding wire to the welding wire coil being used in the welding operation. This procedure of providing replacement welding wire packages and connecting the new package with the trailing end of the package being used is an endless welding wire installation. Such installation uses the present invention.

In accordance with the present invention, there is provided a device for feeding, toward a welding station, welding wire coiled in two separate containers and joined together into an "endless welding wire", as this term is employed in the electric arc welding field. By using the present invention, the height of the guide grommet is reduced. Indeed, the grommet essentially floats into a balanced position dictated by the welding wire being fed to the welding station. Consequently, the feed grommet seeks the appropriate position above the spaced containers. Thus, it can be located quite close to the top of the containers, thereby drastically reducing the head room necessary for the endless welding wire installation.

The novel feeding device of the present invention comprises a track element extending in a path generally including vertical axes of the spaced wire coils butt welded together into an endless welding wire. The track element extends above the coils in a given direction. It carries a grommet with a wire receiving guide opening surrounding a wire guide axis and a generally lower entrant end. The invention involves a carrier mounting the grommet on the track element for movement of the grommet above the coils and along the path determined by the track element. The grommet glides along the track so the trajectory of the wire coming from the coiled supplies determines the position of the wire as it is pulled from the respective coils. In essence, the grommet floats above the containers to match the upwardly moving wire; however, the invention also involves a servo mechanism having an input sensor mounted on the carrier and spaced below the grommet entrant end a distance defining a gap below the grommet. The servo mechanism senses the displacement of the welding wire in the extended direction of the track and creates a feedback signal that is used by a motion device of the servo mechanism to move the grommet to the desired location so the welding wire continues to be vertically oriented in the gap prior to entering the grommet. As the wire pulls in one direction or the other, the servo mechanism moves the grommet to be directly above the vertical orientation of the endless wire.

In the preferred embodiment, the path of movement of the grommet on the track element is linear so the track element extends in a direction or path intersecting generally the center axis of the two spaced coils butt welded together into an endless welding wire. As the wire is pulled from either coil the grommet is moved by the servo mechanism to be vertically aligned with the trajectory of the wire. Thus, the possibility of e-script tangles and bird nesting is reduced. Furthermore, the track element and movable carrier are closely spaced from the top of the containers, so the head room for the endless welding wire installation is less than a distance, such as 2 feet. This drastically increases the locations that will accommodate the installation.

The carrier is moved by the servo mechanism so it generally has a floating action above the natural trajectory of the upwardly directed endless welding wire. The only position constraint is that the floating action of the carrier is in the direction determined by the path of the track element supporting the carrier. This path is generally above the center of the two spaced containers providing the endless welding wire. A rodless cylinder is used. This track member is made by Bimba Manufacturing and is generally shown in Yarnall U.S. Pat. No. 5,491,737. One parallel rod of the track element has an internal, movable magnetic element that is pushed one way or the other according to the sensed displacement of the natural trajectory of the wire moving upwardly into the guide grommet. This centering action is performed by a pneumatic circuit, where the sensing device is moved by the incoming wire and determines the air supplied on one or the other side of the movable magnetic element of piston. When the air is released, the piston stays in its new adjusted position. A magnetic coupling is on the carrier and surrounding the rodless cylinder. It moves with the internal movable magnetic element to position the guide grommet in the desired location determined by natural trajectory of the upwardly moving endless wire.

In accordance with the invention, the grommet is spaced above the containers a short distance, preferably less than about 2 feet. In practice, this spacing is about 1–2 feet. In this manner, the needed head room of the installation is decreased and the exposed length of energized wire is decreased. Thus, there is no need for shielding, as is often required by other endless wire feeding devices.

In accordance with the invention, there is provided a carrier for guiding wire to a welding station. This carrier includes a grommet with a vertical wire receiving guide opening surrounding a guide axis and having a lower entrant end. A pair of passageways in the carrier allows movement of the carrier along two parallel rods extending between the wire supplies joined together to form an endless welding wire. A sensor is mounted on the carrier below the entrant end of the guide grommet to determine any displacement of the upwardly moving welding wire from the vertical axis of the guide grommet.

Furthermore, the invention involves a method of feeding a welding wire from a first and second container of wire, with each container including a coil of wire with a feed end and a trailing end. The trailing end of one container is butt welded to the feed end of the second container to provide an endless welding wire. This method involves providing a wire guide grommet with an entrant end, passing the wire from the feed end to the trailing end through the grommet and then moving the grommet across the containers in a given path according to the vertical orientation of the upwardly moving wire with respect to the entrant end of the grommet. In this method, the path of the moving grommet is less than about 2 feet above the containers having the coiled welding wire. The containers are preferably drums, but may be square boxes.

The novel device for feeding endless welding wire has been defined above; however, it could be further described as a device that also includes a butt welder to join the exposed trailing end of the wire in the first container to the feed end of wire in the second container to create what is called an endless welding wire. A grommet with a vertical wire receiving opening floats above the container in a given path determined by a track element slidably receiving the floating grommet. The path is generally linear and the containers are normally drums. The floating grommet is preferably moved by a servo mechanism responding to the natural position of the wire below the opening of the grommet. The track element includes first and second parallel rods. A carrier mounts the floating grommet and moves along the first rod. A guide passage in the carrier receives the second rod. The first rod is a rodless cylinder of the type sold by Bimba Manufacturing. There is a guide sleeve or sheath above the grommet for directing the welding wire from the floating or movable grommet to the welding station.

The primary object of the present invention is the provision of a feeding device for use in an endless welding wire installation, which feeding device has a reduced head room and reduces tangles and other physical problems associated with wore feeders for endless welding wire installations used in high production welding operations.

Another object of the present invention is the provision of a feeding device, as defined above, which feeding device involves a guide grommet movable along a path above the spaced coils constituting the butt welded coils of welding wire in an endless welding wire installation.

Still a further object of the present invention is the provision of a feeding device, as defined above, which device can be used with any endless welding wire installation having various types of welding wire containers.

Still another object of the present invention is the provision of a method for feeding an endless welding wire to a welding station, which method effectively feeds the endless wire to the welding station and effectively changes from one welding wire coil to the other by using the natural trajectory of the upwardly moving welding wire as it is pulled toward the welding station.

These and other objects and advantages will become apparent from the following description taken together with the accompanying drawings.

PREFERRED EMBODIMENT

Figure 1:
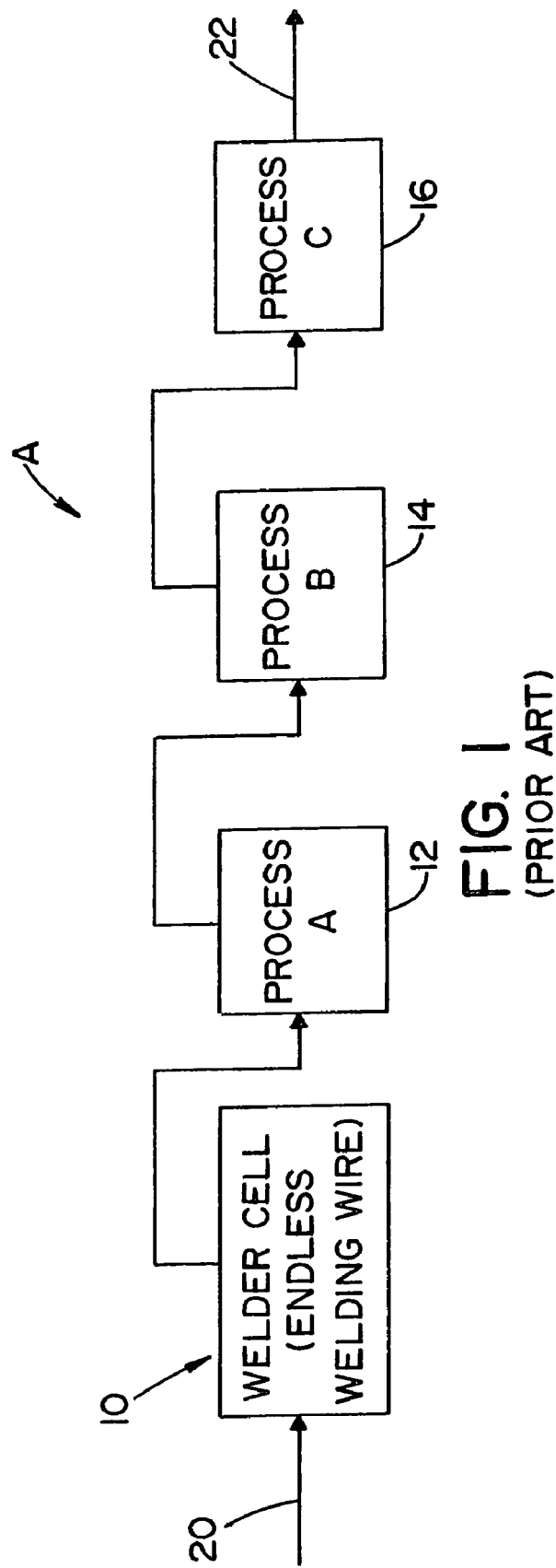
FIG. 1 is a block diagram illustrating a manufacturing layout to which the present invention is directed.
Figure 2:
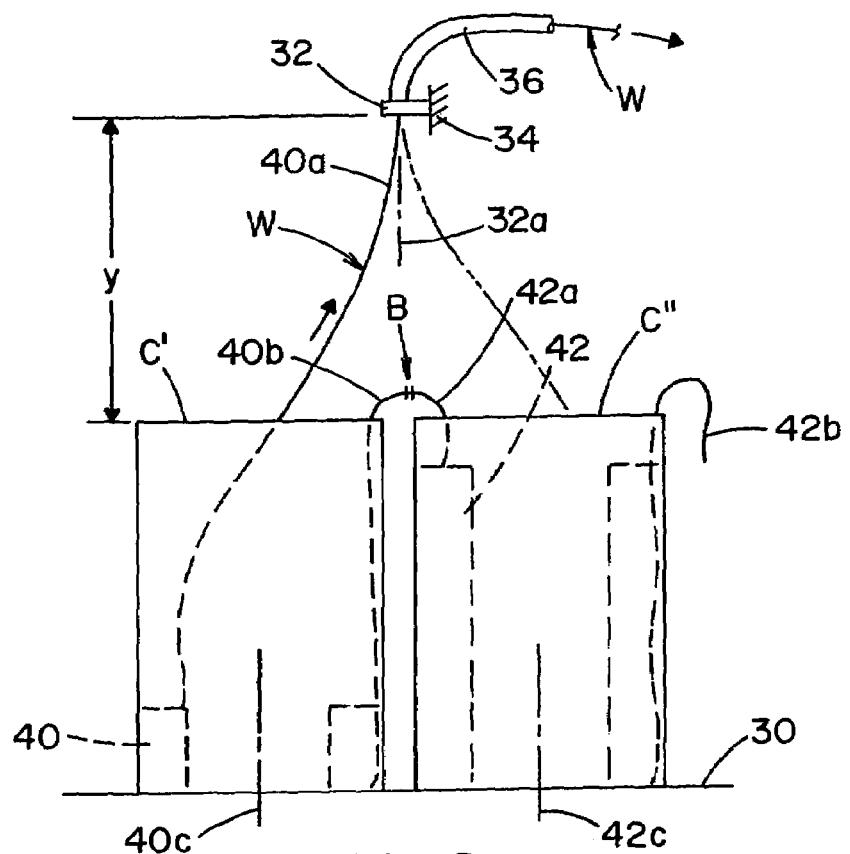
FIG. 2 is a side elevational view of a prior art wire feeder for an endless welding wire installation illustrating the required head room.
Figure 3:
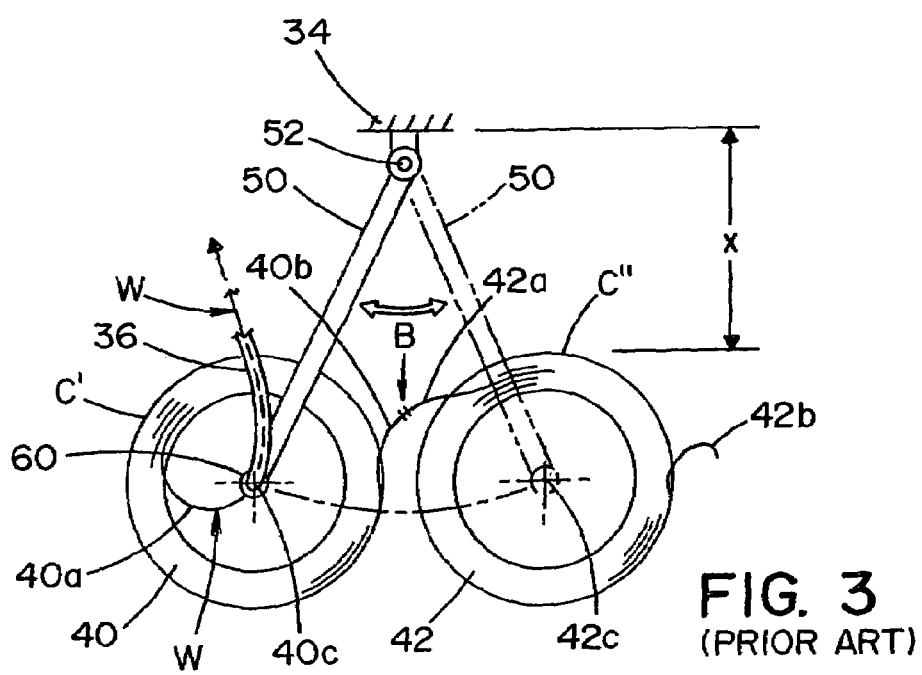
FIG. 3 is a top schematic view of a further prior art endless wire feeder for two spaced drums constituting an endless welding wire installation.

The present invention relates to a wire feeder for an endless welding wire installation such as installation 10 in production or assembly line A shown in FIG. 1. The welding cell using an endless welding wire is part of several manufacturing operations, indicated generally as processes 12, 14 and 16. A component or part enters at input 20 and is processed successively by the welding cell in series with several distinct processing operations to produce a completed part or assembly 22. This type of assembly line, or production line, is a "just in time" manufacturing system. Consequently, an endless welding wire for welding cell 10 is advantageous so the welding wire is never exhausted; therefore, cell 10 need not be shut down for changing the supply of wire. FIG. 1 illustrates that a shut down to replace an empty supply of welding wire with the next supply of welding wire has the effect of shutting down all of the processes 12, 14 and 16. This interruption of flow drastically affects the efficiency and operating costs of manufacturing. Thus, it is desirable to use an endless welding wire for any welding cell in a manufacturing facility. However, attempts to use an endless welding wire installation has met with limited success. Some problems of feeding the endless wire from the wire supply containers to the welding operation of cell 10 have defied solution. For instance, prior feeding devices as shown in FIGS. 2 and 3 have been proposed to feed the endless wire from containers C', C" to a welding operation or station. In FIG. 2, the wire feeder for an endless welding wire installation includes a fixed upper guide grommet 32 spaced from the top of containers C', C" by distance y, which distance is substantially greater than 2 feet. Containers C', C' rest on a support surface 30. Fixed grommet 32 is mounted on a vertically spaced member 34 for guiding endless wire W into and through plastic sheath 36, through which the wire is pulled to perform a welding operation in an adjacent welding station. Endless wire W includes a first coiled supply 40 and a second coiled supply 42, with feed end 40a pulled from container C' until the container is empty. The trailing end 40b is pulled upwardly through grommet 32. Since end 40b is butt welded to feed end 42a of coiled supply 42 by butt weld B, exhaustion of coiled supply 40 merely transfers the supply of endless welding wire from container C' to container C". The second container has an exposed trailing end 40b for attachment to the feed end of the next container that replaces empty container C' in accordance with standard procedure. The coiled wire supplies 40, 42 are called "coils" and include parallel spaced vertical axes 40c, 42c, which axes are generally equally spaced from center vertical axis 32a of grommet 32. By using this prior art structure, height y of grommet 32 must be great enough to accommodate pulling wire from one side of container C' to the remote opposite side of container C", without moving grommet 32. This restricted action dictates a substantial height y for grommet 32.

To accommodate the requirement of pulling wire from coils having spaced axes 40c, 42c, it has been suggested that grommet 32 be mounted on a pivoted or swinging arm 50, as shown in FIG. 3. Arm 50 is pivoted about pin 52 on fixed support 34 between the solid line position and the phantom line position shown in FIG. 3. Guide grommet 60 on the outer end of arm 50 is movable between a position generally above axis 40c to a position generally above axis 42c. This mechanism for feeding endless wire W does allow the normal feeding from the center of coils 40, 42 as in normal electric arc welding with a single container or drum. However, even with pivot arm 50 carrying sheath 36 and guide grommet 60, the pivot arm still must remain substantially above containers C' and C". Furthermore, the endless welding wire feeding 5 installation requires accommodation of the spacing x between containers C', C" and fixed support structure 34 for pivot arm 50. Thus, adoption of the swinging pivot arm to reduce the head room of feeding device introduced further spatial constraints for the endless wire installation. Prior art feeders as shown in FIGS. 2 and 3 are the wire feeders having the disadvantages corrected and overcome by the present invention.

Figure 3A:
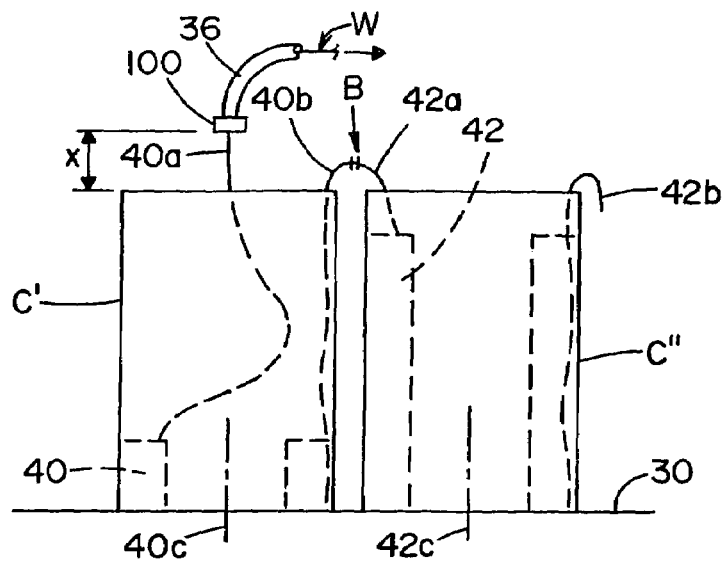
FIGS. 3A–3C are schematic side elevational views of an endless welding wire installation using the basic aspect of the present invention and illustrating the reduced head room obtained by using the present invention.
Figure 3B:
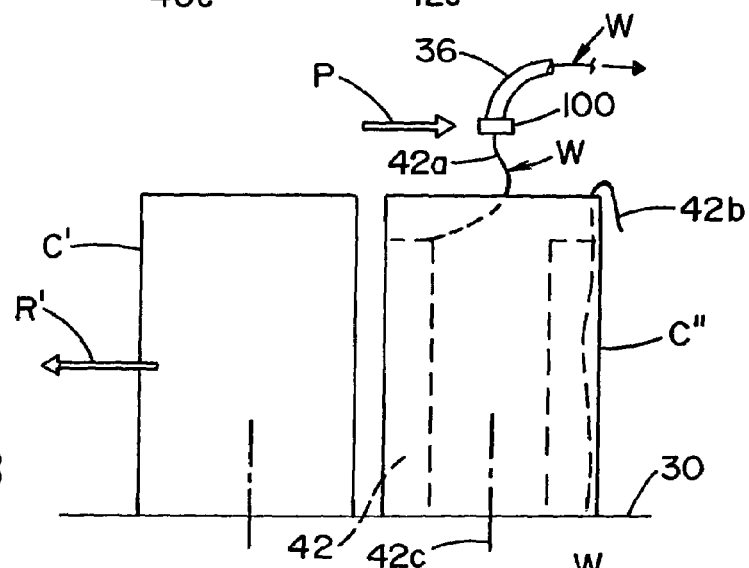
Figure 3C:
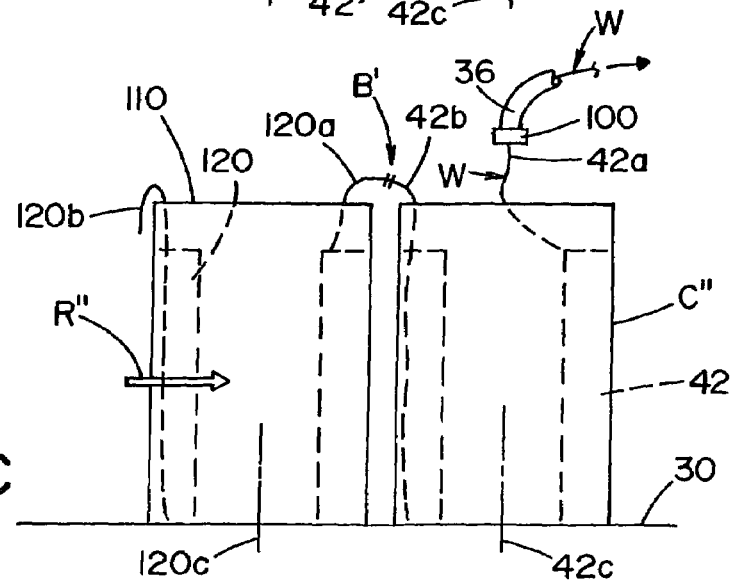

Operation of the present invention is generally described with respect to the schematic presentations of FIGS. 3A, 3B and 3C wherein guide grommet 100 is movable in a path P over the top of spaced containers C', C" that are resting on support surface 30. The containers of FIG. 3A are essentially the same as containers shown in the prior art feeders of FIGS. 2 and 3. Guide grommet 100 is closely spaced from the top of containers C', C" by a distance x, which distance is less than about 2 feet to reduce the head room requirement for the wire feeder used to feed endless wire W first from container C' and then from container C". Transition of floating grommet 100 movable along path P from the empty container C' to the full container C" is illustrated in FIG. 3B. When container C' is empty, grommet 100 is moved along path P to a location determined by the natural vertical trajectory of wire W, which trajectory is generally above axis 42c of container C". When container C' is empty, it is removed along path R' and replaced by a full container or drum 110 moved in the replacement path indicated by arrow R". As wire W is being pulled through sheath 36 and through floating grommet 100 from container C", the coiled supply or coil 120 of welding wire in container 110 is butt welded at B' so that the feed end 120a of coil 120 is connected to the trailing end 42b of coil 42. Trailing end 120b is exposed at the upper end of container 110 for joining to the next successive leading end of the drum to replace drum 110 as it is exhausted. A basic novel concept of the present invention is illustrated in FIGS. 3A, 3B and 3C wherein grommet 110 floats along a path P closely spaced above the welding wire containers between the position for guiding endless wire W from one container and then the new position for guide wire from the next successive container. Details of the preferred embodiment of the invention for floating and moving grommet 100 along path P is shown in detail in FIGS. 11–17.

Figure 5:
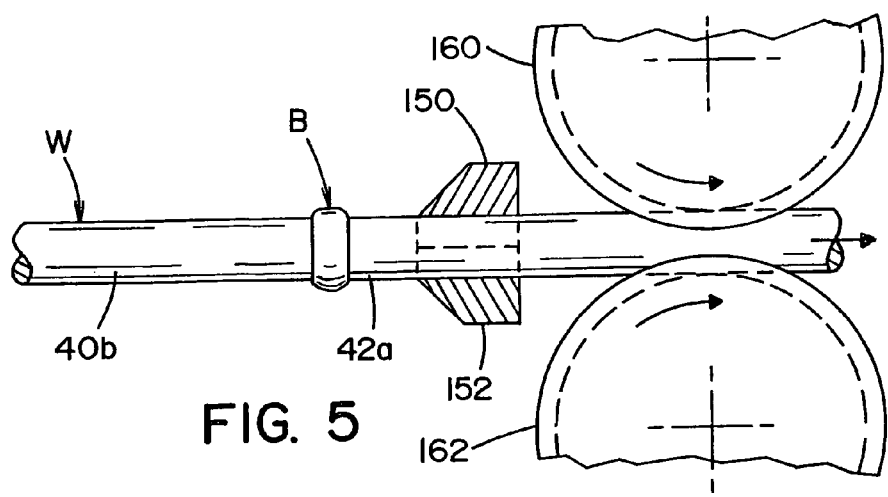
FIG. 5 is an enlarged schematic view illustrating the concept of sizing the butt welded joint between the ends of two adjacent wire coils to produce an endless welding wire for electric arc welding.
Figure 4:
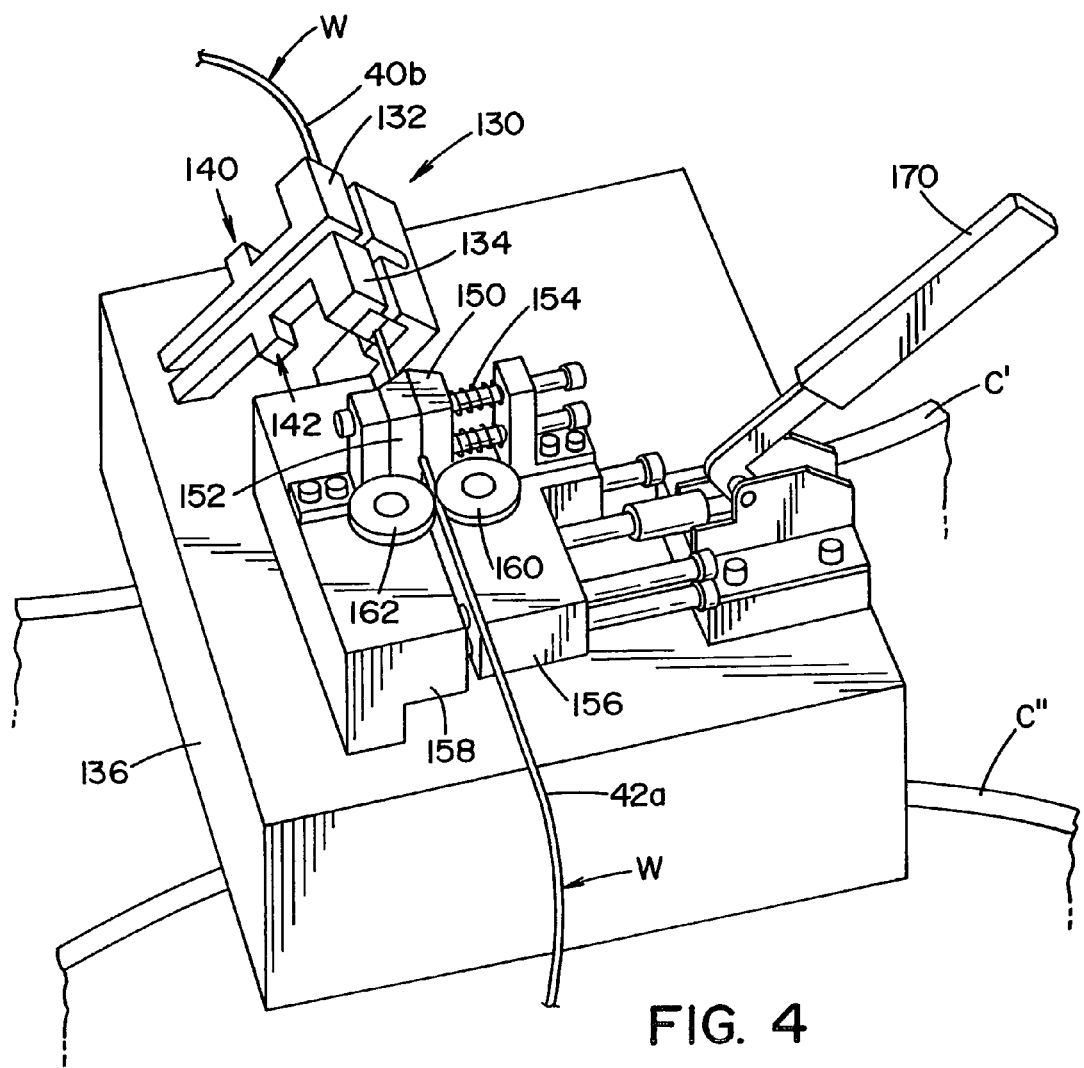
FIG. 4 is a schematic pictorial view of a common butt welding device used for connecting the ends of adjacent wire coils to produce an endless welding wire for electric arc welding.

Any type of butt welder can be used for joining the ends of the wire in spaced containers C', C" to produce an endless welding wire W. A schematically illustrated butt welding mechanism 130 is schematically illustrated in FIGS. 4 and 5 wherein wire ends 40b and 42a are gripped by movable vice members 132, 134 and jammed together by force devices not shown, but illustrated as arrows 140, 142. As the ends 40b, 42a are forced together electric current is passed between the wires by a low frequency power source mounted on or in platform 136. Thus, the two ends 40b and 42a are butt welded to produce the butt weld B shown in FIG. 5. To remove the upset portion of butt weld B, stripper jaws 150, 152 are mounted on movable support 156 and fixed support 158, respectively, and are forced around the welding wire W by lever 170. Spring 154 controls the force between the jaws. End 42a is pulled by drive rolls 160, 162 by a motor also mounted in platform 136 and not shown. Wire W is pulled through the stripping jaws 150, 152 to remove the upset portion of the butt weld. Lever 170 moves the drive rolls and stripping jaws against the wire for pulling the butt welded wire through the gripping jaws. To release the mechanism, lever 170 is moved in the opposite direction. The mechanism schematically illustrated in FIGS. 4 and 5 is only representative to show that the invention is used for an endless wire installation. Details of the butt welder and wire stripping mechanism do not form a part of the present invention. It is illustrated only for general showing of a device now used in some endless welding wire installations.

Figure 6A:
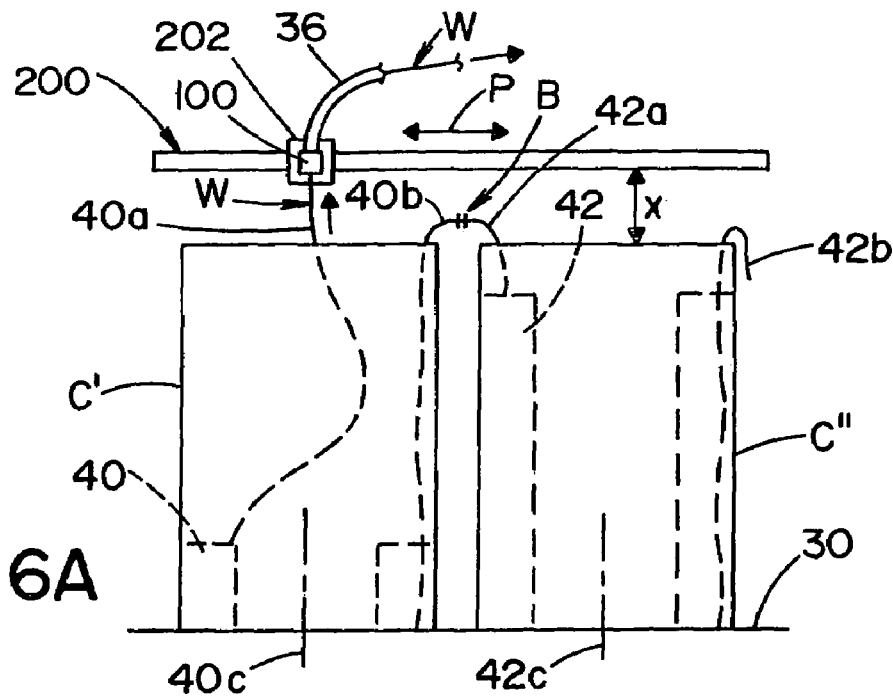
FIGS. 6A and 6B are side elevational views similar to the views shown in FIGS. 3A–3C illustrating the broad concept of the preferred embodiment of the present invention.
Figure 6B:
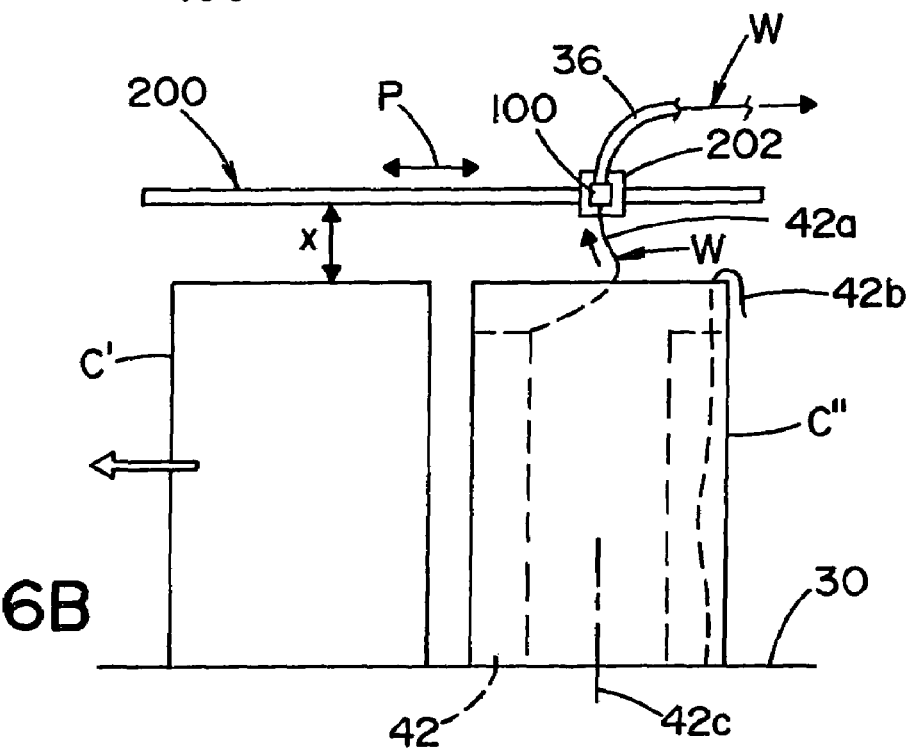
Figure 7:
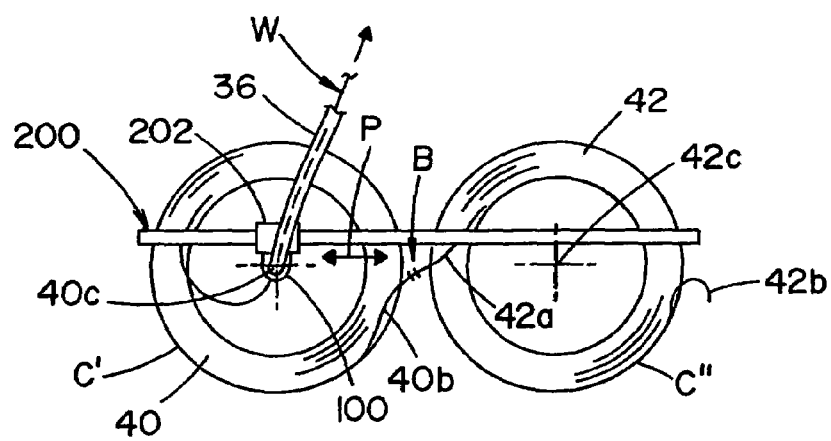
FIG. 7 is a top elevational view of the feeding device shown in FIGS. 6A–6B used with adjacent drums constituting the containers for the endless welding wire.
Figure 8:
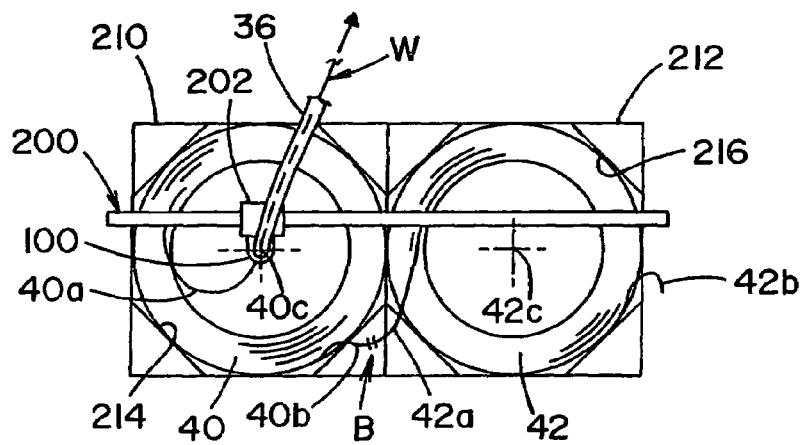
FIG. 8 is a top plan view similar to FIG. 7 illustrating the use of the present invention with adjacent square boxes instead of the preferred round drums, as shown in FIG. 7.
Figure 8A:
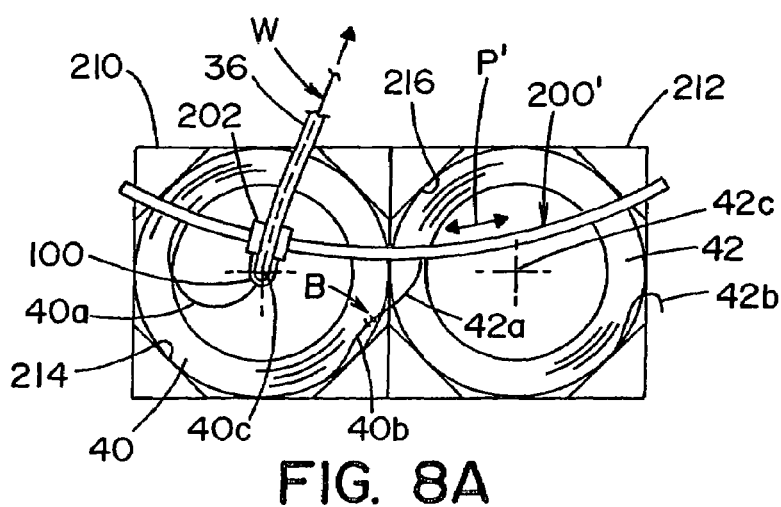
FIG. 8A is a top plan view similar to FIG. 8 illustrating the concept of providing a non-linear track element for use in practicing the present invention.

The schematic illustration of movable grommet 100 in FIGS. 3A, 3B and 3C is expanded in FIGS. 6A, 6B. A structure is provided for controlling movement of spool 100. This structure is a linear track element 200 extending horizontally over the tops of container C', C" a distance x. Track 200 controls movement of carrier 202 that supports and moves guide grommet 100 as it is shifted along path P. A top view of the installation as shown in FIGS. 6A, 6B is illustrated in FIG. 7. Path P extends generally between axes 40c, 42c. FIGS. 8 and 8A are presented to illustrate certain modifications of the invention. For instance, FIG. 8 replaces cylindrical drums C', C" with cardboard boxes 210, 212 having the standard octagonal liners 214, 216, respectively. By use of boxes, the containers can be aligned by merely placing the two boxes together as shown in FIG. 8. In FIG. 8A, linear track element 200 need not be exactly straight. A somewhat curvilinear track 200' can perform the invention. Floating guide grommet 100 is moved from a position over axis 40c to a position over axis 42c. The exact configuration of path P, which is preferably linear can be somewhat non-linear such as path P'. FIGS. 8 and 8A reveal how the basic concepts of the present invention can be modified by using the equivalent structures and concepts.

Figure 9:
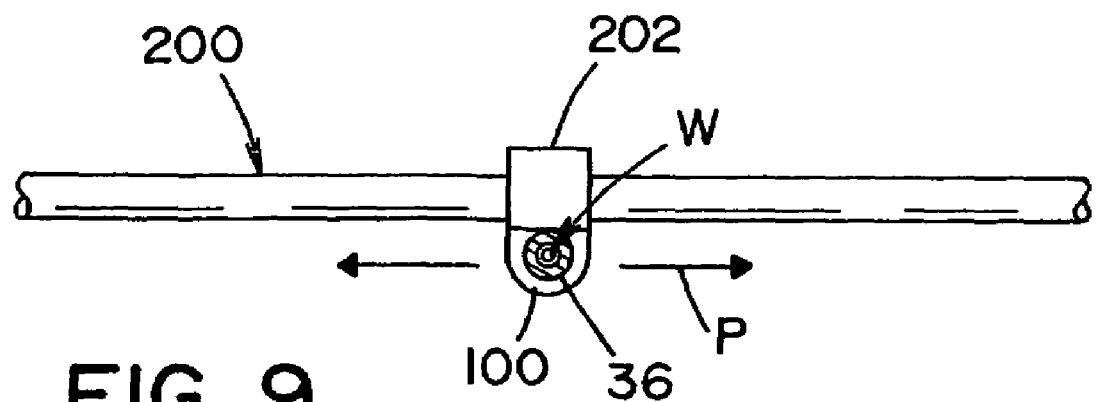
FIG. 9 is a partial top view of the preferred embodiment of the present invention.
Figure 10:
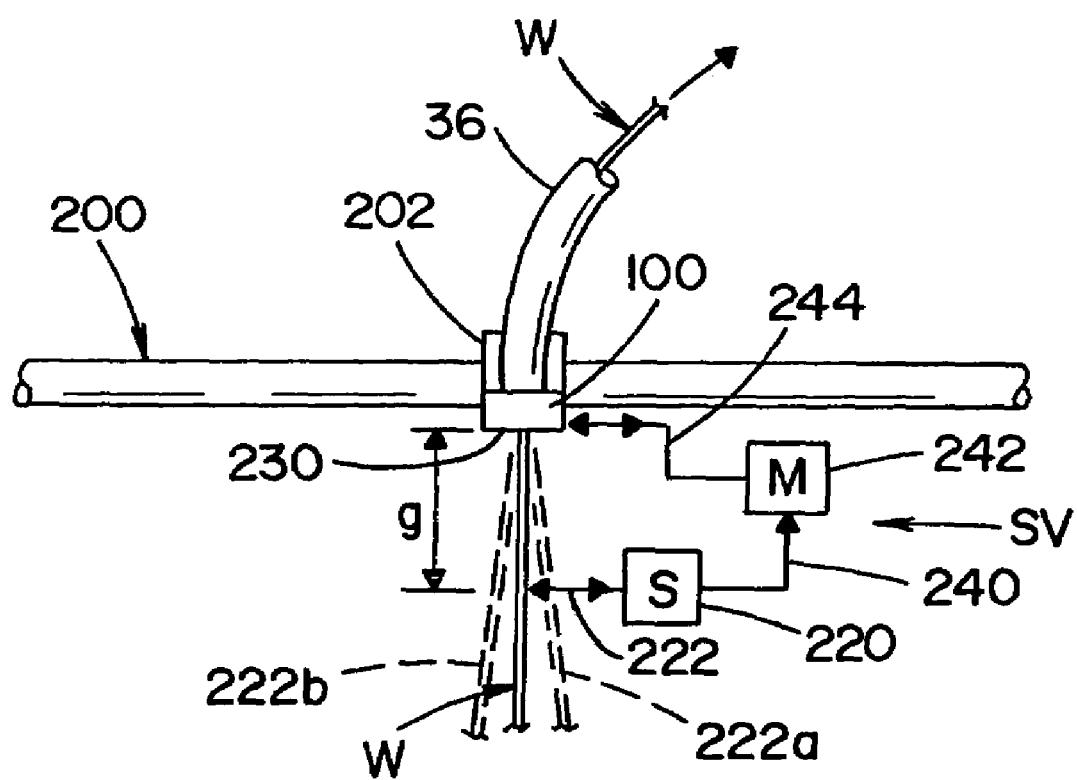
FIG. 10 is a schematic side elevational view of the preferred embodiment of the present invention, illustrating the general concept of a servo mechanism.
Figure 11:
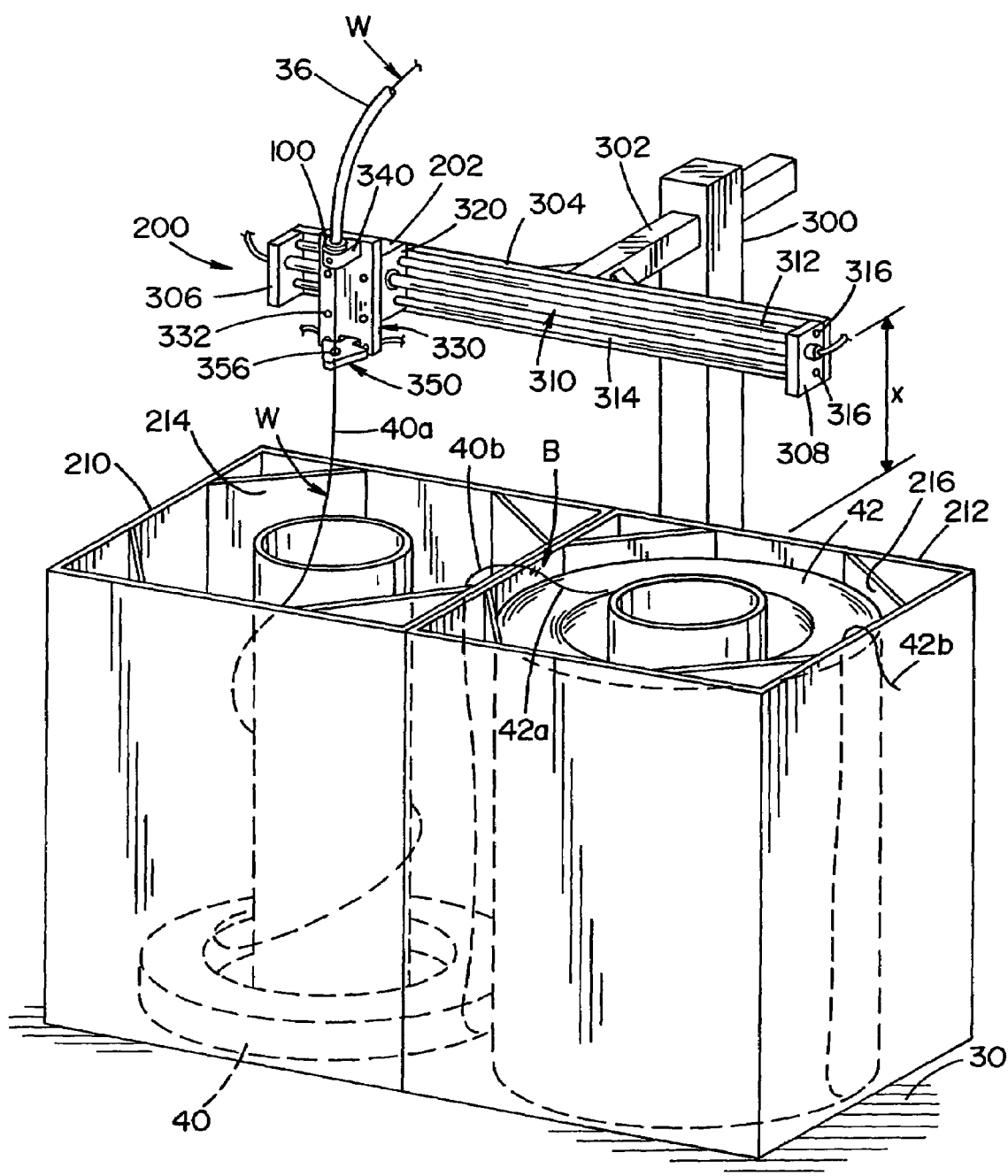
FIG. 11 is a pictorial view of the preferred embodiment of the present invention.
Figure 12:
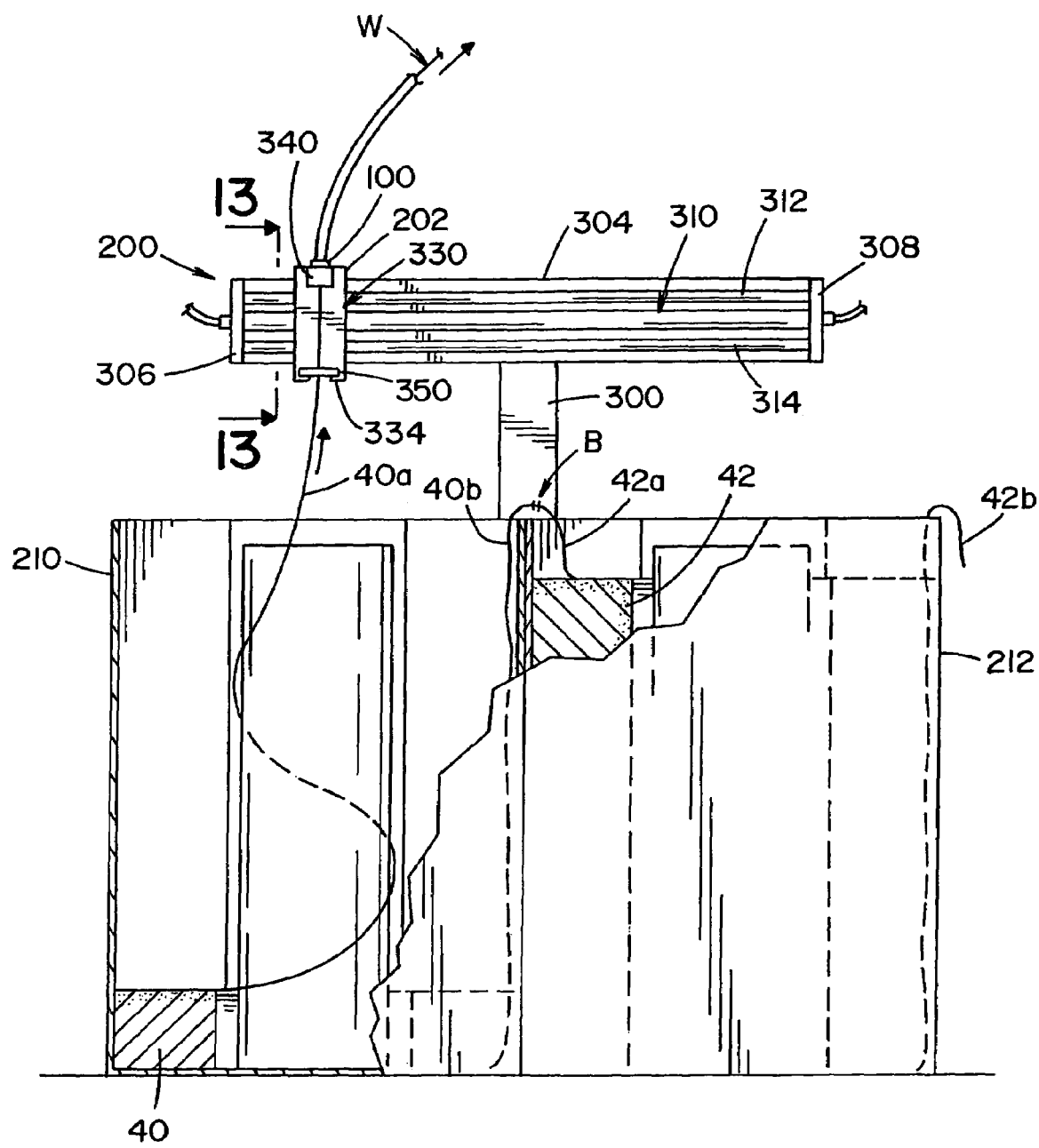
FIG. 12 is a front view partially in cross-section of the preferred embodiment of the present invention illustrated in FIG. 11.
Figure 13:
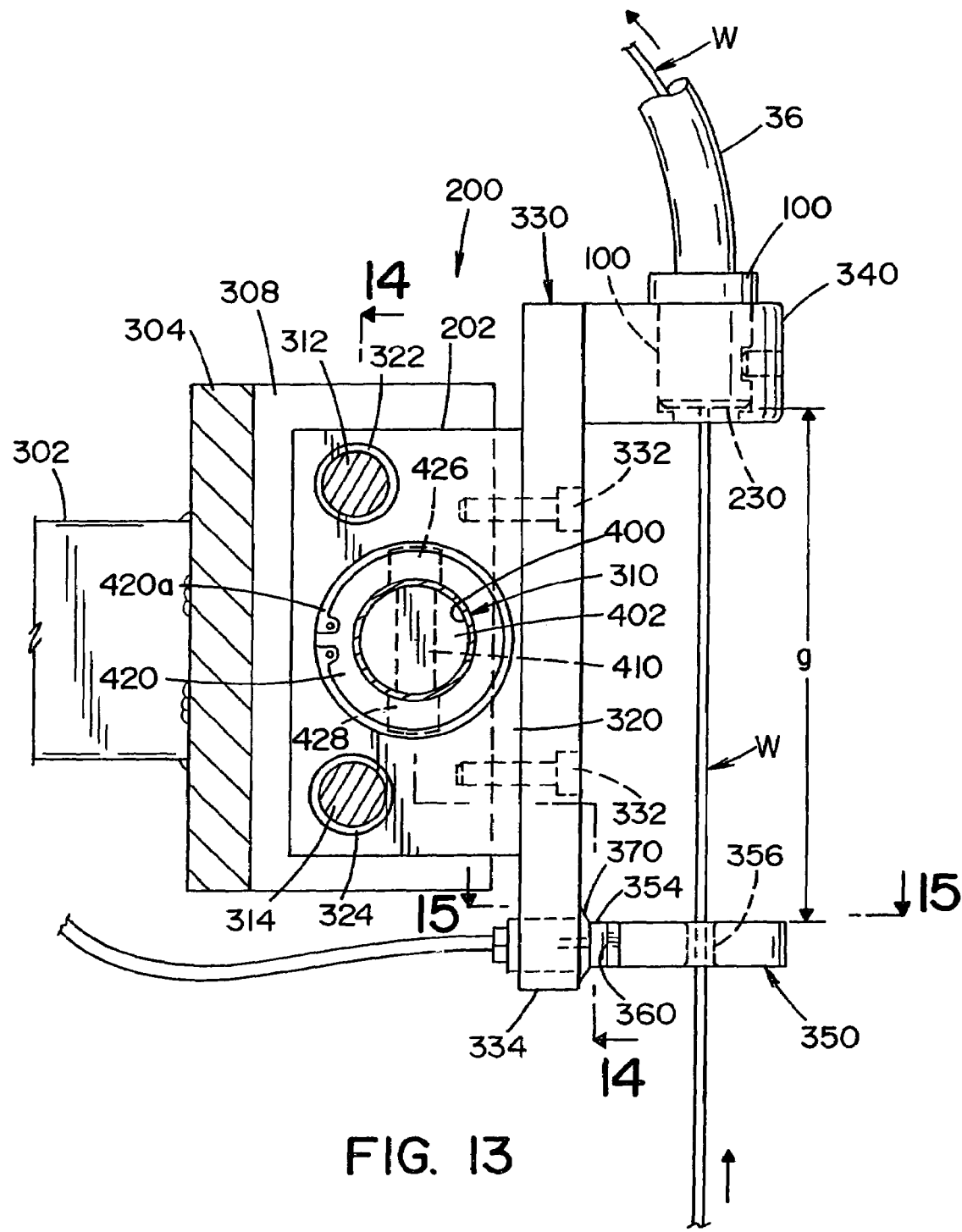
FIG. 13 is an enlarged cross-sectional view taken generally along line 13—13 of FIG. 12.

The preferred embodiment of the present invention involves moving carrier 202 along track element 200 by a servo mechanism as schematically illustrated in FIGS. 9 and 10. Servo mechanism SV includes a sensor 220 to sense displacement of wire W at position 222 below the lower entrant end 230 of grommet 100. The space between entrant end 230 and position 222 defines a gap g in which wire W is intended to be substantially vertical and aligned with the central axis of grommet 100. Sensor 220 detects if wire W is deflected in the direction of path P to position 222a in one direction and position 222b in the opposite direction. These two directions are along path P, as shown in FIG. 9. If the wire is displaced to a position 222a, sensor 220 creates a signal in line 240, which signal is directed to motion device 242. This signal causes output drive element 244 to move carrier 202 to the right for vertical orientation or alignment of wire W. In a like manner, if wire W is displaced to the left position 222b, a reverse signal is provided at output 240 of sensor 220 forcing motor device 242 to drive element 244 in the opposite direction moving carrier 202 to the left. Thus, grommet 100 is aligned with the desired or natural vertical feeding trajectory of wire W to facilitate feeding of wire W through grommet 100 and sheath 36. Sensor 220 is mounted on carrier 202 so it senses displacement of wire W in one direction or the other with respect to path P as grommet 100 moves between spaced containers C', C" of the endless welding wire installation. Various servo mechanisms can be provided, as well as various track elements 200; however, the preferred implementation of the present invention has specific structural details for these elements as shown in FIGS. 11–17.

The mechanical features of the practical embodiment are best described in FIGS. 11–14. Track element 200 is mounted on support stanchion 300 having a horizontal arm 302 and a fixed back plate 304 with spaced facing ends or caps 306, 308. Track element 200 includes a center rodless cylinder 310 which is a previously described commercial product. Guide rods 312, 314 are assembled between ends 306, 308 by bolts 316 and are parallel to rodless cylinder 310. These parallel rods define the path of movement of carrier 202. Carrier 202 includes housing 320 with parallel guide passageways 322, 324 for slidably receiving in cylindrical bearings guide rods 312, 314, respectively. Front mounting plate 330 is affixed to housing 320 by bolts 332. Lower extension 334 has clearance slot 336 to allow pivoting action of the sensor elements 350. Upper gudgeon block 340 positions guide grommet 100. A round opening in the grommet has a low friction surface, such as a TEFLON (Polytetrafluoroethylene) sleeve that surrounds its vertical axis and defines lower entrant end 230. On mounting plate 330 below entrant end 230 is a pivoted sensor element 350 spaced from grommet 100 by gap g. Sensor element 350 is pivotally mounted in clearance slot 336 of lower extension 334 by pivot pin 352. A rearwardly extending arm 354 is movable in slot 336. Circular opening 356 of sensor element 350 receives wire W. Sensor element 350 pivots about pin 352 as wire W is displaced to the right or to the left. Extending from arm 354 are two spaced, angled cutoff surfaces 360, 362. These surfaces coact with vent orifices 370, 372 for controlling the servo mechanism best shown in FIGS. 15–17.

Figure 14:
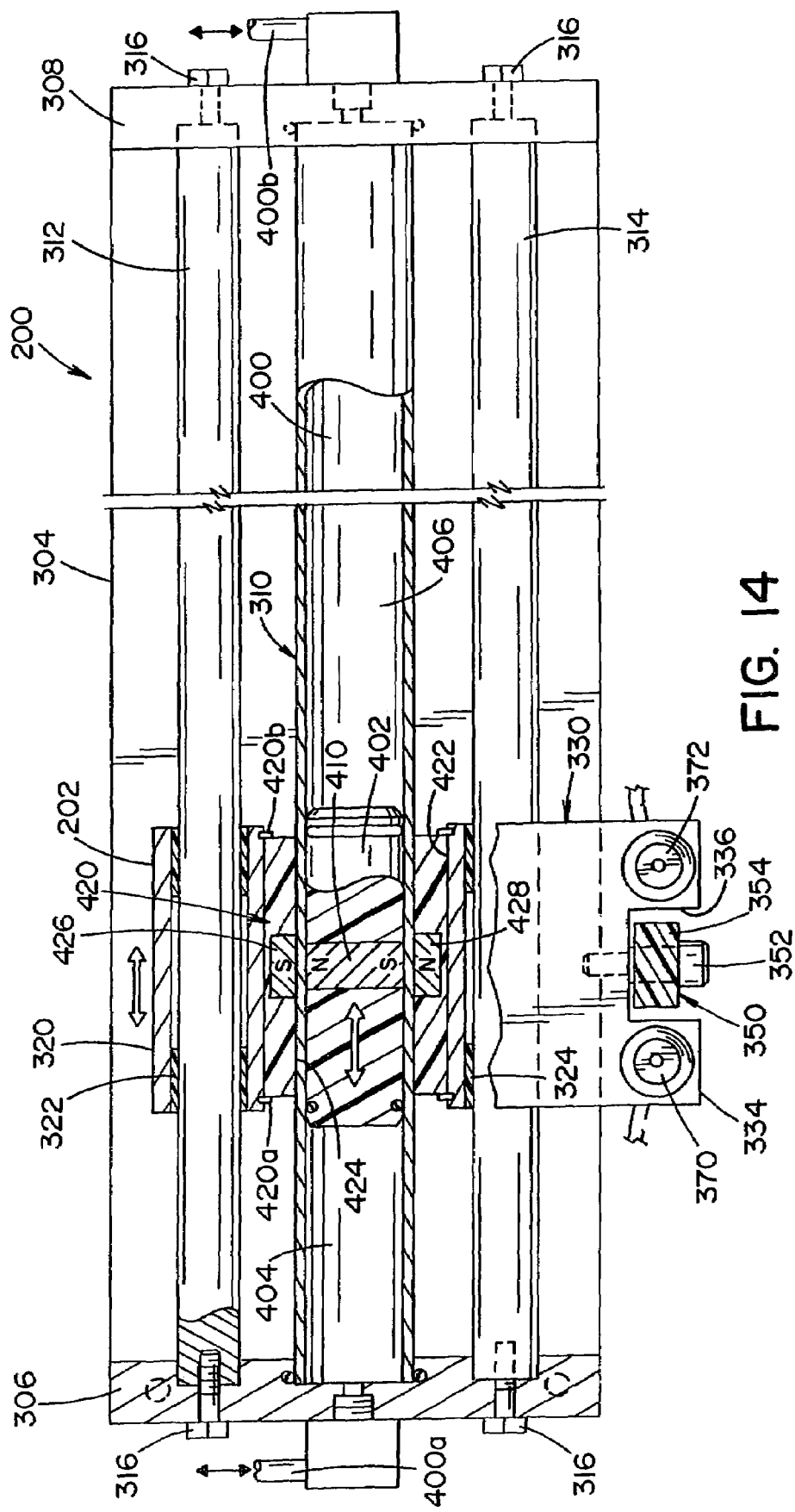
FIG. 14 is a partial cross-sectional view taken generally along line 14—14 of FIG. 13.

Carrier 220 slides on commercially available rodless cylinder 310. The details of this rod are best shown in FIG. 14. A central passage 400 slidably receives cylindrical piston 402 to define air volumes 404, 406 on opposite sides of the piston. Volume 404 is connected to air line 400a and, in a like manner, volume 406 is connected to line 400b. Within piston 402 there is a strong permanent magnet element 410 that coacts with cylindrical magnet carrier element 420 surrounding rodless cylinder 310 and held into bore 422 of housing 320 by snap rings 420a, 420b. Central passage 424 allows a sliding action of element 420 on rod 310. Within ring or element 420 are spaced permanent magnets 426, 428 facing the poles of magnet 410 in floating piston 402. Carrier 420 is pulled axially along rods 312, 314 by movement of piston 402 caused by the difference in pressure in volumes 404, 406. Coupling of element 420 with piston 402 is by magnetic force between magnet 410 and magnets 426, 428. Thus, movement of piston 402 pulls carrier 420; however, there is no physical connection so it is possible to break the coupling with a relatively small force. In this manner, wire W can not be forced into an unnatural location or can not cause tangles by improper movement of cylinder 402. Pivoting element 350 is the sensing member for the servo mechanism, which member provides a signal when displacement of wire W pivots element 350 a distance covering either vent orifice 370 or vent orifice 372. Such displacement of the wire controls air in volumes 404, 406 to move carrier 202 along cylinder 310 so wire W between opening 356 and grommet 100 is generally aligned with the vertical axis of the grommet. In this manner, the grommet is moved or floats along path P to maintain a vertical orientation of wire W in gap g.

Figure 15:
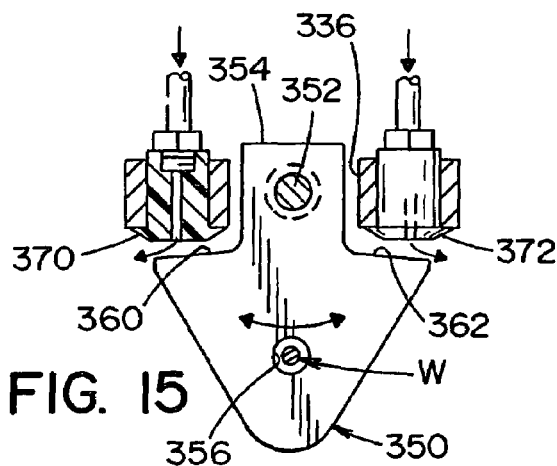
FIG. 15 is a partial top elevational view illustrating the displacement sensor of the servo mechanism used in the preferred embodiment of the present invention.
Figure 16:
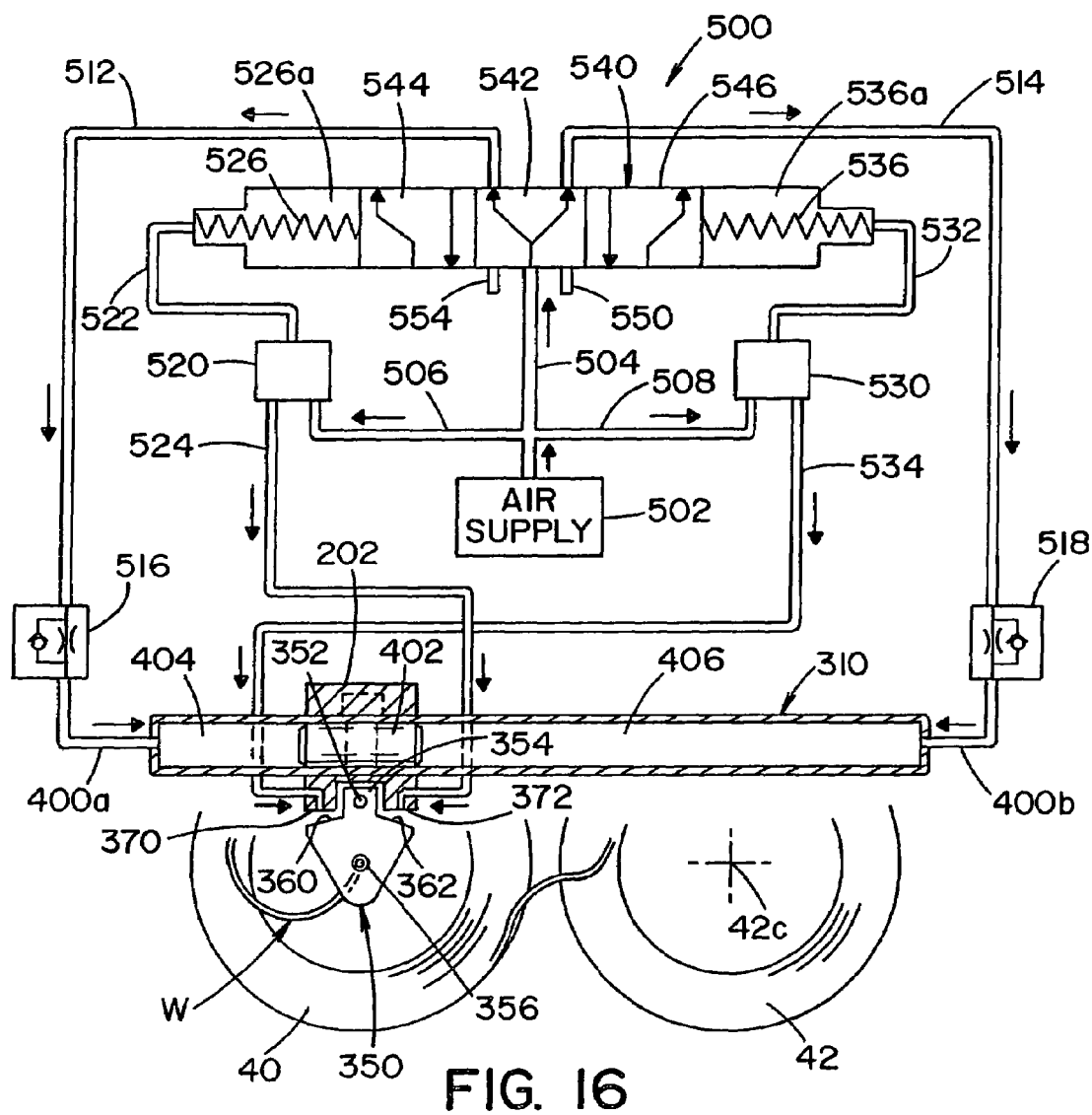
FIG. 16 is a top elevational view with a superimposed pneumatic circuit employed in the servo mechanism of the preferred embodiment of the present invention.
Figure 17:
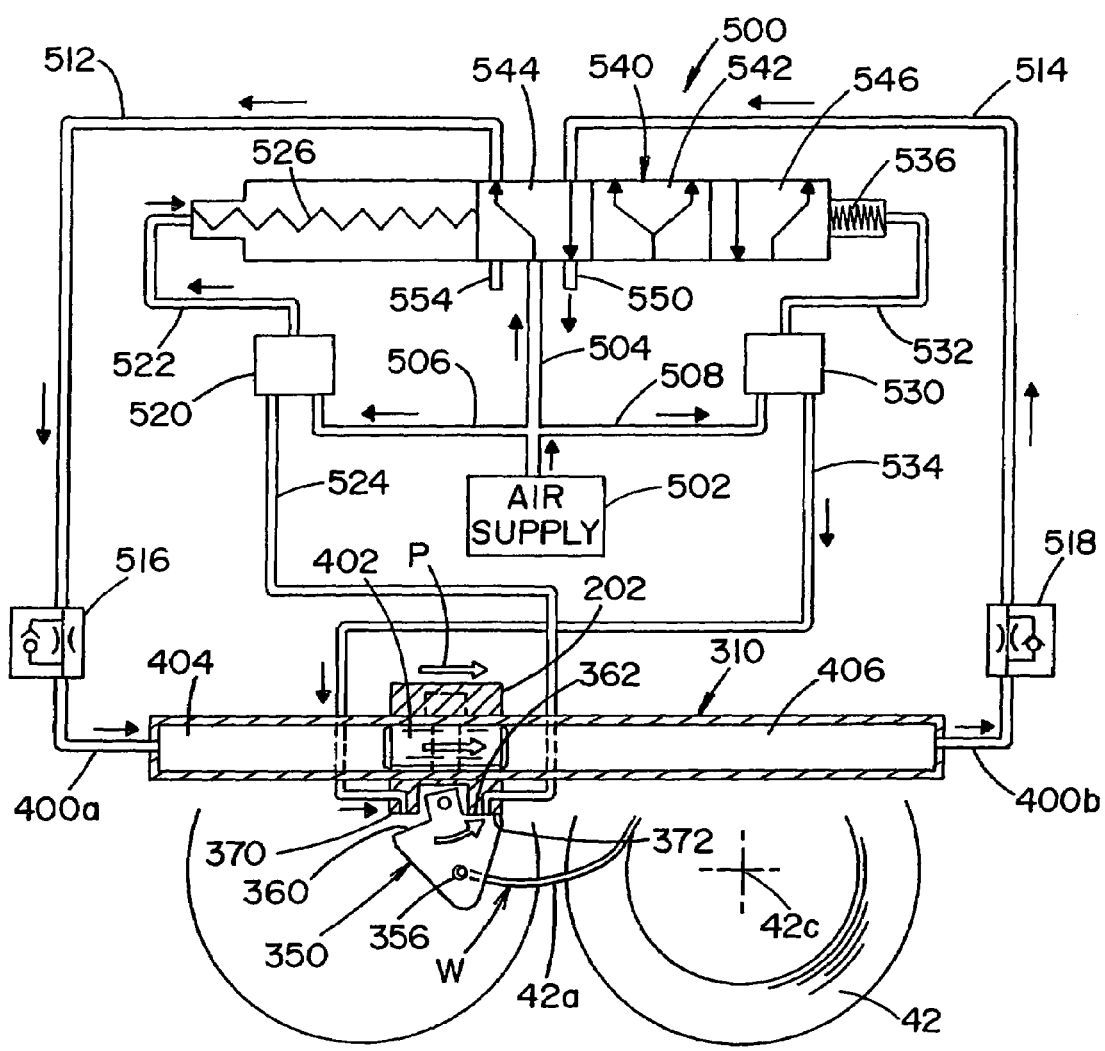
FIG. 17 is a view similar to FIG. 16 illustrating movement of the carrier for the guide grommet utilizing the pneumatic servo mechanism of the preferred embodiment; and, FIG. 18 is a top plan view illustrating optional mechanisms to be applied to the preferred embodiment of the present invention.

The pneumatic system 500 operates in response to the position of sensor element 350, best shown in FIG. 15. The hydraulic system can have a variety of configuration. Indeed, the servo mechanism can be mechanical or electrical. In the preferred embodiment it is pneumatic using system 500 shown in FIGS. 16 and 17. Air supply 502 directs pressurized air in lines 504, 506 and 508. Lines 400a, 400b are connected to piston balancing lines 512 514 through control valves 516, 518 allowing pressure to bleed from volumes 404, 406, but preventing rapid movement of the piston in either direction. The basic features of system 500 involves the operation of bypass valves 520, 530. Bypass 520 includes a primary outlet line 522 and pressure control line 524. Line 522 is used in conjunction with spring 526 in chamber 526a. In a like manner, bypass valve 530 includes a primary outlet line 532 and pressure control line 534. Line 532 acts in unison with spring 536 in chamber 536a. Slide valve 540 includes three sections 542, 544 and 546. Exhaust lines 550, 554 are aligned with the valve sections 542, 544 and 546 as they are moved into the center position. In FIG. 16, the position of carrier 202 is stabilized with opening 356 aligned with the vertically spaced guide grommet 100. Pressure is maintained on line 512, 516 to maintain the axial position of piston 402 and thus carrier 202 magnetically coupled to this piston. As long as the wire moves vertically through opening 356, system 500 is balanced as shown in FIG. 16. Assume that there is displacement of wire W to the right as shown in FIG. 17. This happens when wire W converts from coil 40 to coil 42. Element 350 pivots counterclockwise, with surface 362 closing vent orifice 372. There is a pressure buildup in line 524 so that this line can not vent bypass valve 520. Thus, the pressure in line 506 is directed to the chamber 526a of spring 526 to move slide valve 540 to the right. Thus, pressurized line 504 is connected through valve portion 544 to line 512 and line 514 is vented. Air is directed through valve 516 into volume 404 moving piston 402 to the right forcing carrier 202 to the right. This compensates for the deflection of wire W to the right. This action will continue until wire W is vertically aligned with the axis of grommet 100 by being above coil 42. When that happens, surface 362 is pivoted away from vent orifice 372 to vent the pressure in line 524. This removes pressure from line 522 causing springs 526 and 536 to center slide valve 540. Springs 526, 536 are selected to maintain valve 540 centered when vents 370, 372 are opened. When sensor element 350 pivots clockwise, the reverse action illustrated in FIG. 17 takes place. Thus, carrier 220 is moved by system 500 to maintain the upper guide grommet 100 directly above the trajectory that wire W wants to follow as it is being pulled from the containers. When the first container is exhausted and the second container is operated, element 350 is held in the position shown in FIG. 17 until carrier 202 moves above coiled wire 42 where it is again stabilized. In this manner, the guide grommet moves or floats back and forth as schematically illustrated and described with respect to FIGS. 3A, 3B, 3C, 6A, 6B and 7–10. However, the preferred and practical implementation of the present invention is illustrated in FIGS. 11–17.

Figure 18:
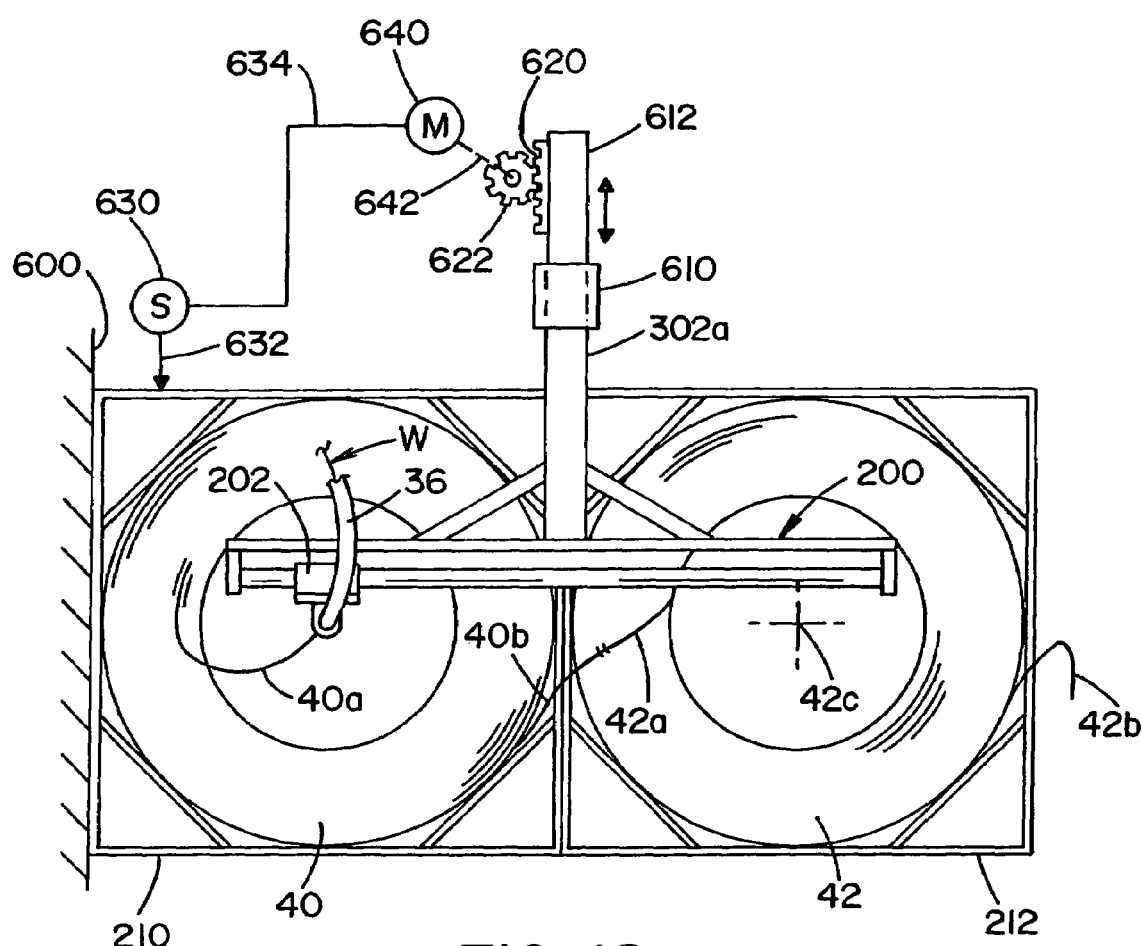

A slight modification of the present invention is illustrated in FIG. 18, wherein containers in the form of boxes 210, 212 are moved together and then positioned against a fixed surface 600. In this embodiment, the alignment of track element 200 over the axes 40c, 42c is automatic and controlled by a device to transfer track element 200 laterally. This automatic transfer device is schematically illustrated as a fixed channel 610 slidably receiving rod 612 to slide horizontally under the control of a rack 620 driven by pinion 622. Rod 612 having a horizontal arm 302a to at least partially support transfer track element 200. Sensor device 630 includes feeler 632 for engaging the front face of boxes 210. The position of the box produces a signal in line 634 driving motor 640 connected to pinion 622 by a shaft 642. Thus, by merely moving the boxes 210, 212 together against surface 600, feelers 632 move track element 200 to the proper lateral position above the matched boxes. This showing merely illustrates a device for adjusting the lateral position of track element 200 over wire coils 40, 42. Consequently, the containers themselves need not be accurately positioned in the endless wire installation. The track member can be adjusted either manually or automatically to the proper position over the center of the coils.

Having thus defined the invention, the following is claimed:

1. A device for feeding toward a welding station a welding wire stored in a first container in a first coil generally concentric with a first vertical axis and a second container in a second coil generally concentric with a second vertical axis spaced longitudinally from said first axis in a given direction, said device comprising: a track element extending in a path generally including said axes and extending above said coils in said given direction; a grommet with a vertical wire receiving guide opening surrounding a guide axis and having a lower entrant end; a support mechanism mounting said grommet on said track element for movement of the grommet above said coils and along said path; and, a mechanism with an input sensor mounted on said support mechanism and spaced below said grommet entrant end a distance defining a gap below said grommet to sense displacement of said welding wire generally in said given direction and a motion device responsive to said sensed displacement to move said grommet in the direction of said displacement, whereby said wire is generally aligned with said guide axis by said mechanism as it moves through said gap.

2. A device as defined in claim 1 wherein said path is generally linear.

3. A device as defined in claim 2 wherein said mechanism is a servo mechanism.

4. A device as defined in claim 1 wherein said mechanism is a servo mechanism.

5. A device as defined in claim 4 wherein said containers are drums.

6. A device as defined in claim 3 wherein said containers are drums.

7. A device as defined in claim 2 wherein said containers are drums.

8. A device as defined in claim 1 wherein said containers are drums.

9. A device as defined in claim 4 wherein said containers are boxes.

10. A device as defined in claim 3 wherein said containers are boxes.

11. A device as defined in claim 2 wherein said containers are boxes.

12. A device as defined in claim 1 wherein said containers are boxes.

13. A device as defined in claim 12 wherein said track element includes at least first and second rods and said support mechanism is a carrier movable along said first rod with a guide passage for said passage along said second rod.

14. A device as defined in claim 13 wherein said first rod is a rodless cylinder with an internal movable magnetic element and said carrier includes a magnetic coupling surrounding said first rod and movable with said magnetic element.

15. A device as defined in claim 11 wherein said track element includes at least first and second rods and said support mechanism is a carrier movable along said first rod with a guide passage for said passage along said second rod.

16. A device as defined in claim 15 wherein said first rod is a rodless cylinder with an internal movable magnetic element and said carrier includes a magnetic coupling surrounding said first rod and movable with said magnetic element.

17. A device as defined in claim 10 wherein said track element includes at least first and second rods and said support mechanism is a carrier movable along said first rod with a guide passage for said passage along said second rod.

18. A device as defined in claim 17 wherein said first rod is a rodless cylinder with an internal movable magnetic element and said carrier includes a magnetic coupling surrounding said first rod and movable with said magnetic element.

19. A device as defined in claim 9 wherein said track element includes at least first and second rods and said support mechanism is a carrier movable along said first rod with a guide passage for said passage along said second rod.

20. A device as defined in claim 19 wherein said first rod is a rodless cylinder with an internal movable magnetic element and said carrier includes a magnetic coupling surrounding said first rod and movable with said magnetic element.

21. A device as defined in claim 8 wherein said track element includes at least first and second rods and said support mechanism is a carrier movable along said first rod with a guide passage for said passage along said second rod.

22. A device as defined in claim 21 wherein said first rod is a rodless cylinder with an internal movable magnetic element and said carrier includes a magnetic coupling surrounding said first rod and movable with said magnetic element.

23. A device as defined in claim 7 wherein said track element includes at least first and second rods and said support mechanism is a carrier movable along said first rod with a guide passage for said passage along said second rod.

24. A device as defined in claim 23 wherein said first rod is a rodless cylinder with an internal movable magnetic element and said carrier includes a magnetic coupling surrounding said first rod and movable with said magnetic element.

25. A device as defined in claim 6 wherein said track element includes at least first and second rods and said support mechanism is a carrier movable along said first rod with a guide passage for said passage along said second rod.

26. A device as defined in claim 25 wherein said first rod is a rodless cylinder with an internal movable magnetic element and said carrier includes a magnetic coupling surrounding said first rod and movable with said magnetic element.

27. A device as defined in claim 5 wherein said track element includes at least first and second rods and said support mechanism is a carrier movable along said first rod with a guide passage for said passage along said second rod.

28. A device as defined in claim 27 wherein said first rod is a rodless cylinder with an internal movable magnetic element and said carrier includes a magnetic coupling surrounding said first rod and movable with said magnetic element.

29. A device as defined in claim 4 wherein said track element includes at least first and second rods and said support mechanism is a carrier movable along said first rod with a guide passage for said passage along said second rod.

30. A device as defined in claim 29 wherein said first rod is a rodless cylinder with an internal movable magnetic element and said carrier includes a magnetic coupling surrounding said first rod and movable with said magnetic element.

31. A device as defined in claim 3 wherein said track element includes at least first and second rods and said support mechanism is a carrier movable along said first rod with a guide passage for said passage along said second rod.

32. A device as defined in claim 31 wherein said first rod is a rodless cylinder with an internal movable magnetic element and said carrier includes a magnetic coupling surrounding said first rod and movable with said magnetic element.

33. A device as defined in claim 2 wherein said track element includes at least first and second rods and said support mechanism is a carrier movable along said first rod with a guide passage for said passage along said second rod.

34. A device as defined in claim 33 wherein said first rod is a rodless cylinder with an internal movable magnetic element and said carrier includes a magnetic coupling surrounding said first rod and movable with said magnetic element.

35. A device as defined in claim 1 wherein said track element includes at least first and second rods and said support mechanism is a carrier movable along said first rod with a guide passage for said passage along said second rod.

36. A device as defined in claim 35 wherein said first rod is a rodless cylinder with an internal movable magnetic element and said carrier includes a magnetic coupling surrounding said first rod and movable with said magnetic element.

37. A device as defined in claim 32 wherein said motion device includes air cylinders to move said internal magnetic element.

38. A device as defined in claim 30 wherein said motion device includes air cylinders to move said internal magnetic element.

39. A device as defined in claim 32 wherein said servo mechanism is a pneumatic servo mechanism.

40. A device as defined in claim 31 wherein said servo mechanism is a pneumatic servo mechanism.

41. A device as defined in claim 30 wherein said servo mechanism is a pneumatic servo mechanism.

42. A device as defined in claim 29 wherein said servo mechanism is a pneumatic servo mechanism.

43. A device as defined in claim 4 wherein said servo mechanism is a pneumatic servo mechanism.

44. A device as defined in claim 3 wherein said servo mechanism is a pneumatic servo mechanism.

45. A device as defined in claim 12 wherein said grommet is spaced above said containers a distance less than 2 feet.

46. A device as defined in claim 11 wherein said grommet is spaced above said containers a distance less than 2 feet.

47. A device as defined in claim 10 wherein said grommet is spaced above said containers a distance less than 2 feet.

48. A device as defined in claim 9 wherein said grommet is spaced above said containers a distance less than 2 feet.

49. A device as defined in claim 8 wherein said grommet is spaced above said containers a distance less than 2 feet.

50. A device as defined in claim 7 wherein said grommet is spaced above said containers a distance less than 2 feet.

51. A device as defined in claim 6 wherein said grommet is spaced above said containers a distance less than 2 feet.

52. A device as defined in claim 5 wherein said grommet is spaced above said containers a distance less than 2 feet.

53. A device as defined in claim 4 wherein said grommet is spaced above said containers a distance less than 2 feet.

54. A device as defined in claim 3 wherein said grommet is spaced above said containers a distance less than 2 feet.

55. A device as defined in claim 2 wherein said grommet is spaced above said containers a distance less than 2 feet.

56. A device as defined in claim 1 wherein said grommet is spaced above said containers a distance less than 2 feet.

57. A device as defined in claim 12 including a wire guide sleeve above said grommet for directing said weld wire toward said welding station.

58. A device as defined in claim 11 including a wire guide sleeve above said grommet for directing said weld wire toward said welding station.

59. A device as defined in claim 10 including a wire guide sleeve above said grommet for directing said weld wire toward said welding station.

60. A device as defined in claim 9 including a wire guide sleeve above said grommet for directing said weld wire toward said welding station.

61. A device as defined in claim 8 including a wire guide sleeve above said grommet for directing said weld wire toward said welding station.

62. A device as defined in claim 7 including a wire guide sleeve above said grommet for directing said weld wire toward said welding station.

63. A device as defined in claim 6 including a wire guide sleeve above said grommet for directing said weld wire toward said welding station.

64. A device as defined in claim 5 including a wire guide sleeve above said grommet for directing said weld wire toward said welding station.

65. A device as defined in claim 4 including a wire guide sleeve above said grommet for directing said weld wire toward said welding station.

66. A device as defined in claim 3 including a wire guide sleeve above said grommet for directing said weld wire toward said welding station.

67. A device as defined in claim 2 including a wire guide sleeve above said grommet for directing said weld wire toward said welding station.

68. A device as defined in claim 1 including a wire guide sleeve above said grommet for directing said weld wire toward said welding station.

* * * * *